United States Patent [19]

Moriki et al.

[11] Patent Number: 4,881,365

[45] Date of Patent: Nov. 21, 1989

[54] ASSEMBLY APPARATUS FOR TRUCK LINKS

[75] Inventors: Yasumitsu Moriki, Tokyo; Hirotomo Numakura, Kawasaki, both of Japan

[73] Assignee: Maruma Jyusharyo Kabushiki Kaisha, Tokyo, Japan

[21] Appl. No.: 295,042

[22] Filed: Jan. 6, 1989

[51] Int. Cl.⁴ .............................................. B21L 19/00
[52] U.S. Cl. ............................................ 59/7; 59/901
[58] Field of Search ...................... 59/7, 8, 35.1, 901.5; 72/420

[56] References Cited

U.S. PATENT DOCUMENTS

| | | | |
|---|---|---|---|
| 3,028,724 | 4/1962 | Kaplan et al. | 59/7 |
| 3,075,346 | 1/1963 | Quarve et al. | 59/7 |
| 4,027,471 | 6/1977 | Lipp et al. | 59/7 |
| 4,612,765 | 9/1986 | Livesay | 59/7 |
| 4,718,228 | 1/1988 | Moriki et al. | 59/7 |

Primary Examiner—David Jones
Attorney, Agent, or Firm—Emmanuel J. Lobato; Robert E. Burns

[57] ABSTRACT

An apparatus for assemblying link chains of the type having paired links joined together with cross pins joining successive pairs of links longitudinally as chain links having a pitch corresponding to the distance between successive cross pins connecting the paired links. The apparatus has a pair of opposed presses each having a corresponding ram head. The ram heads are cylically operated from a retracted starting position and advanced toward each other and retracted to their retracted position. The ram heads are provided with tools on tool bars for transporting and assemblying paired links on successive cross pins. A trolley travels between the ram heads in a diection forwardly three half pitches and then in a reverse direction two half pitches. The trolley upon reaching the second reverse half-pitch returns to the forward movement of its next operating cycle. The trolley advances successive individual cross pins spaced along the path of travel and thus transports the link chain assembly. The tools on the ram heads position the links onto opposite ends of stationary two successive cross pins as paired links. The links are held in assembly on the cross pins by retainer rings fixed on opposite ends of the cross pins when the cross pins are stationary at the end of the reverse or backward movement of one half pitch by the trolley.

4 Claims, 4 Drawing Sheets

ASSEMBLY APPARATUS FOR TRUCK LINKS

BACKGROUND OF THE INVENTION

The present invention relates to link chains and more particularly to an apparatus for assemblying link chains.

Heretofore link chains such as truck chains are assembled by fitting links onto a bushing and a cross pin inserted into the bushing. The chain being assembled is then fed or advanced pitch by pitch to complete it. It being understood that a pitch as used herein is the distance between the cross pins joining paired links and joining the links longitudionally into chain links. The distance is measured in the longitudinal direction of corresponding link chain.

During assembly of link chains the links sometimes slip off the cross pins and this impedes the assembly of link chains. Generally in the assembly of link chains anti-slipout rings are press fitted on the cross pins after assembly of the chain in order to hold the links in assembly. This has not been adequate to avoid the slip-off problem during assembly of link chains.

SUMMARY OF THE INVENTION

It is an object of the present invention to provide an apparatus for assembly of link chains without the problems of known assembly apparatus.

Another object is to provide an efficient apparatus and method for assembly of link chains.

The apparatus for assemblying link chains according to the invention provides for pressing an anti-slipout ring on each end of the individual cross pins to hold paired links forming chain links and joining longitudinally the chain link in assembly. This is done while the individual chain links are being assembled. The anti-slipout rings are pressed on to the cross pins at half-pitch steps of advancement of the link chain during assembly thereof.

The apparatus comprises a press having a pair of ram heads having corresponding tool bars with tools thereon and are cyclically operated or advanced from a stationary retracted position to advanced or operational positions in which the ram heads are brought closer to each other and then again retracted. A trolley is provided with seats for receiving the cross pins within bushings on the link chain assembly for advancing or reverse movement thereof by half-pitch steps to position the cross pins in position for placing of the links on the pins and lock or anti-slipout rings thereon in sequential steps.

The trolley and the ram head movements are sequenced in timed relationship. The trolley moves the link chain assembly and stops. During the stationary period of the trolley and the link chain assembly being transported the press ram heads execute the advance movement thereof for the tools thereon to effect operations on the links and pins. The trolley effects transporting of the link chain assembly during the periods of retracted positions of the ram heads.

Pins disposed axially within corresponding bushings are fed successively by a feed device, between the ram heads for assembly of links thereon. The feed device delivers the pins, forming the cross pins joining the links and paired chain links, at a proper pitch distance. The link chain assembly is moved efficiently in half-pitch steps in positioning of the cross pins between the ram heads.

Provision is made in the apparatus for guiding the link chain assembly by a receiving plate along an assembly path longitudinally of the link chain assembly. The receiving plate and the trolley are moved upwardly and downwardly in timed relationship and in proper sequence with the travel of the trolley and ram head movements to allow the periodic movement of the link chain assembly.

BRIEF DESCRIPTION OF THE DRAWING

The apparatus for assembly of chain links can be better understood from the following description, appended claims and drawing in which:

FIGS. 5(I), 5(II), 5(III) and (5IV) are respectively diagrammatic plan views of the steps of assembly of a link chain according to the invention.

DESCRIPTION OF THE PREFERRED EMBODIMENTS

Figure 1:
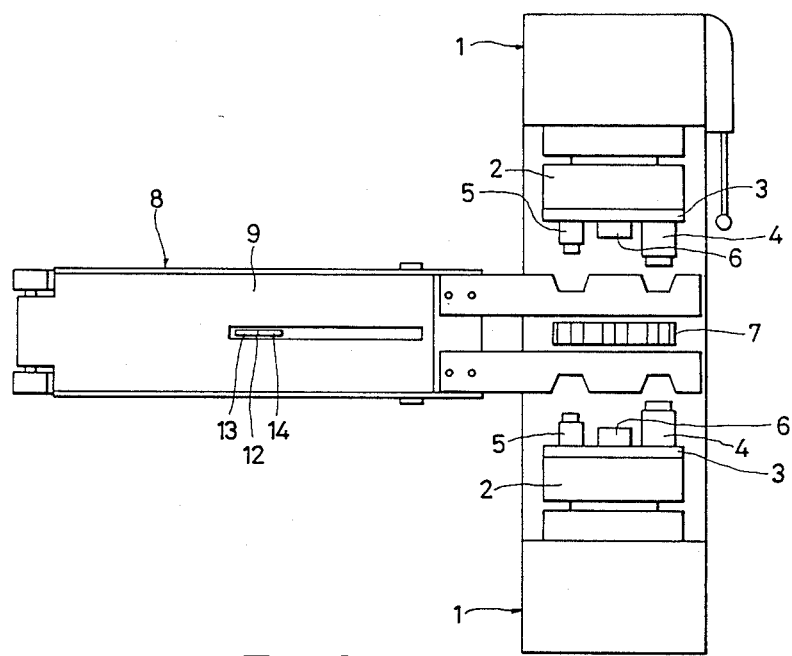
FIG. 1, is a diagrammatic plan view of a link chain assembly apparatus according to the present invention.

An apparatus for assembly of link chains according to the invention is illustrated in FIG. 1. A truck press 1 has two ram heads 2 each of which has a tool bar 3 on which is mounted a bushing tool 4 and a cross pin tool 5. A respective base block 6 is centrally located in each corresponding tool bar 3.

Between the press ram heads is disposed an insert device in the form of a jaw 7 for receiving and positioning a bushing and a pin as hereinafter explained. A feed device 8 is provided for advancing an assembled link chain assembly longitudinally along an assembly path. A chain-placing or receiving plate 9 over which a link chain travels is moved upwardly and downwardly and a trolley 10 is driven forwardly and backwardly by a hydraulic cylinder 11. A hydraulic cylinder 11a lifts and lowers the chain-placing plate. The feed mechanism for the trolley is conventional on known link chain assembly apparatus and is accordingly not shown in detail.

Figure 3:
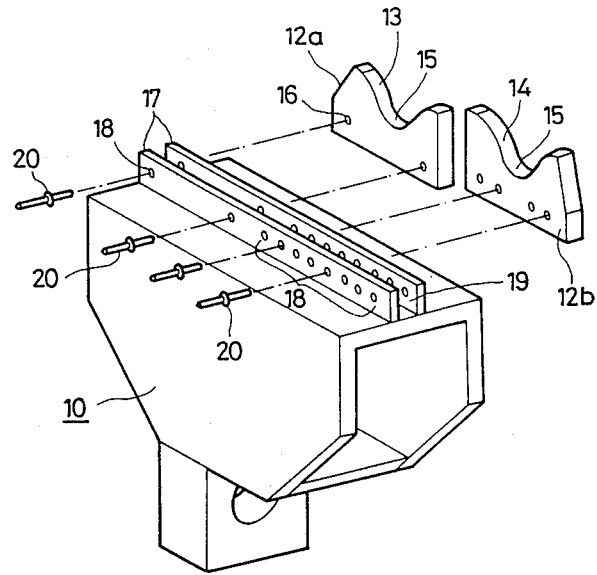
FIG. 3, is a fragmentary perspective view, on an enlarged scale, of a trolley and cross pin receiving seats for transporting link chain cross pins.
Figure 2:
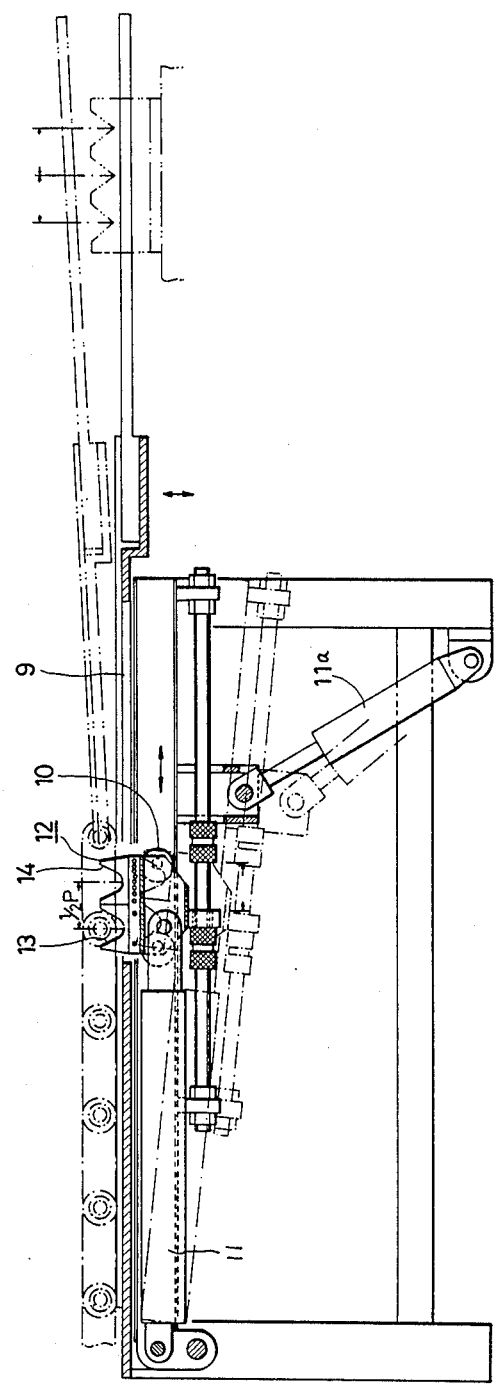
FIG. 2, is longitudinal sectional side elevation view, on an enlarged scale, of a chain feeding device of the apparatus illustrated in FIG. 1.
Figure 4:
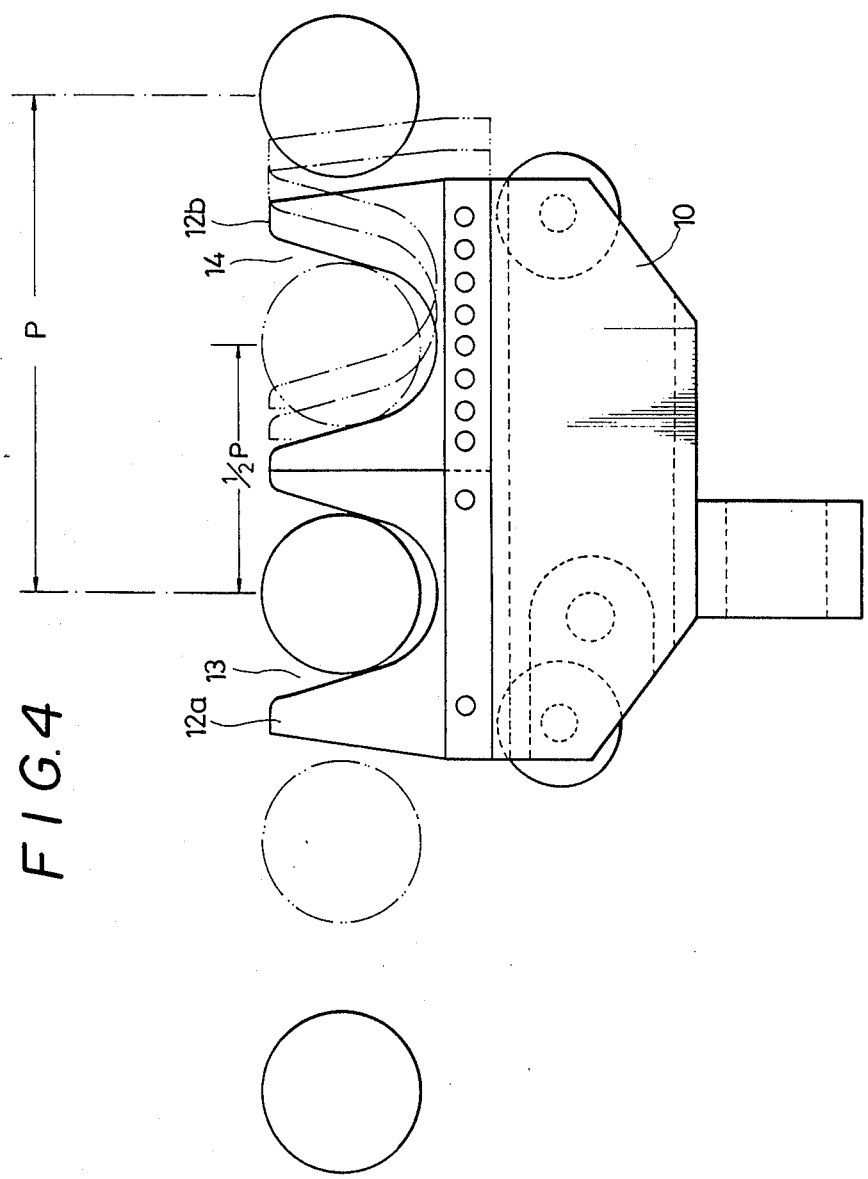
FIG. 4, is a fragmentary diagrammatic side elevation view, on an enlarged scale, for illustrating the relationship between the receiving seats of the trolley of FIG. 1 and the pitch of a link chain according to the invention.

The trolley 10 has, as shown in FIGS. 3 and 4 a removable plate 12 with seats for receiving bushings. The seat arrangement is divided into two sections 12a and 12b for use with different link sizes.

Bushing-engaging recesses 13 and 14 define seats formed at intervals of half pitch ($\frac{1}{2}$P of the pitch P) with a recess curvature 15 which is different for different link size arrangements. The seat sections 12 and 12b are provided with holes 16. The two sections are removably mounted between two parallel mounting plates 17 on the upper surface of the trolley 10. The parallel plates have holes 18 in registry with the seat sections' holes 16. A groove 19 is formed between the parallel plates 17 and in which the two seat sections 12a, 12b are removably mounted by insertion of pins 20 into the registering holes 16,18.

Figure 5:
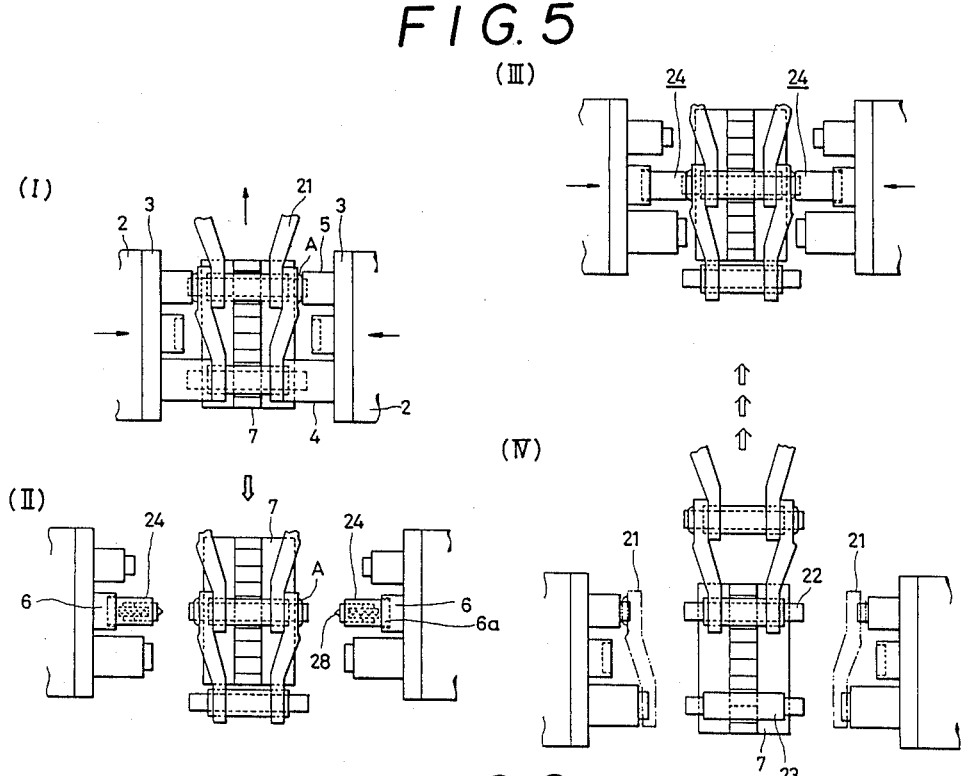

The individual links 21 are provided with openings adjacent the ends thereof and fitted on to respective cross pins 22 extending axially through corresponding bushings 23. The links are placed on the tools 4,5 of the tool bars when stationary in a retracted position as shown in FIG. 5(IV) for placing on the cross pins 22 within the bushings 23 fed by the insert or jaw device 7. The trolley 10 advances the link chain assembly three half pitches to the position shown in FIG. 5(I) in which the ram heads 2 of the press 1 are actuated to an operative position mounting the paired links 21 on the cross pins as shown.

Once the links 2 are located on the cross pins the ram heads 2 are separated or retracted and the link chain assembly is moved rearwardly a half-pitch by the trolley 10 and the receiving plate 12 to the position FIG. 5(II). As can be seen a boss A on the links will confront the base block 6 of the tool bars 3. An anti-slipout ring deformation tool 24 is mounted in a recess 6a of the base block 6 as the ram heads 2 are being retracted.

Figure 6:
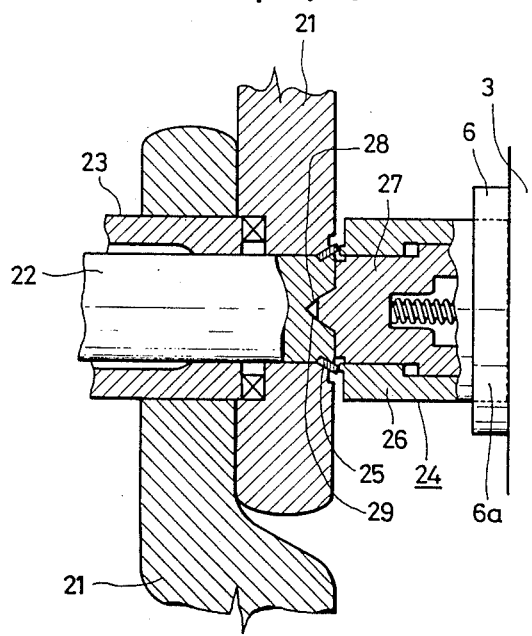
FIG. 6, is a fragmentary sectional view, on an enlarged scale, for illustrating the assembly of a link chain assembly by apparatus according to the invention.

The invention provides for assembly of different types of paired links into link chains. As can be seen in FIG. 6 links 21 are constructed lengthwise somewhat differently than those in FIG. 5. In each type link chain counstruction, however, the links overlap as in FIGS. 5 and 6. The pins 22 all have an annular circumferential groove on opposite end portions thereof for receiving a metallic anti-slipout ring 25 which extends outwardly axially of the circumference of the corresponding pin. The individual different type links have a boss A which is outermost in the overlapped links and in which an undercut allows the retainer ring 25 to be inserted into position as the ram heads 2 are retracted to the position in FIG. 5(II). An annular recess is formed on the outer face of the boss A of the outermost overlapping link and is disposed circumferentially of the anti-slipout ring 25 as shown in the detail enlarged view FIG. 6.

The ring-deforming tool 24 is provided with a tubular portion 26 housing a spring-loaded guided plunger body 27 that has a pilot frusto-conical projection 28 which fits into a conical center recess 29 of a corresponding end of the pin. The chain link assembly is retracted a half pitch to the position shown in FIG. 5(III) at which point the press ram heads are actuated forwardly to the position shown in FIG. 5(III). The ring-deforming tool enters the pin end recess 29 and centers the plunger body 27. As the ram head continues its advancing movement the outer tubular portion of the deforming tool 24 bears on the anti-slipout ring 25 and flares it by pressing it against the peripheral recessed outer wall of the boss A of the corresponding outer link 21. The flaring deformation locks the links on to the corresponding end of the individual cross pin since the deformed ring bears on the outer face of the individual link.

While the operation of the ram head tools has been described as to one end of a cross pin 22 it will be understood that the same operations take place on both opposite end portions of the cross pins. Both paired links 21 of each type shown are locked in place by an anti-slipout ring 25. The locking of the links in place precludes the links from slipping off the corresponding cross pins. An important aspect of the assembly apparatus and method of assembly of link chains according to the invention is the placing of the anti-slipout rings 25 in position and deforming them during the assembly operation. This completely avoids the assembly problems encountered when the anti-slipout rings are placed on the cross pins after assembly in the conventional apparatus and methods of assembly.

The movement of the link chain assembly in ½ pitch steps in conjunction with the use of the anti-slipout rings provides efficient working and assembly procedures. The centering of the press operation in deforming the anti-slipout rings obtains a good load balance. Moreover, since the press-fit pressure is unfornly applied to the anti-slipout rings 25, the press-fit stability of the rings is improved.

We claim:

1. Apparatus for assemblying link chains of the type having paired links joined together with cross pins joining successive pairs of chain links longitudinally, the chain links having a pitch corresponding to a distance between successive cross pins connecting paired chain links, the apparatus comprising a press having two ram heads cyclically operable toward each other from a retracted position to a position closer to each other and cyclically retracted to said retracted position, trolley means disposed for travel between the opposed press ram heads, means for cyclically advancing the trolley means in a direction forwardly three half pitches of a link successively and then in a reverse direction one half pitch and cyclically in timed relationship with the cyclically operable rams heads of the press, the trolley means being disposed stationary between the ram heads each time the ram heads are operated toward each other, said trolley means having transport means for receiving and transporting cross pins spaced thereon successively a distance of a pitch of a link corresponding to the distance between successive cross pins in the assembled link chain, the individual ram heads having means for each transporting a respective link and for placing corresponding links respectively on opposite ends of each successive pair of cross pins while the trolley means is stationary between the two ram heads for forming successive paired links, said ram heads having means for fixing individual retainer rings on corresponding opposite ends of a corresponding cross pin joining longitudinally a pair of successive paired links when the transport means is stationary between ram blocks each time after having moved in said reverse direction one half pitch, and the retainer rings retaining the successive paired links in assembly on corresponding cross pins.

2. Apparatus for assemblying link chains according to claim 1, in which each cross pin has opposite end portions each having a circumferential groove for receiving an individual said retainer ring, and the means for fixing the retainer rings on corresponding opposite ends of a corresponding cross pin comprising tools for deforming the retainer rings successively during assembly of the link chains.

3. Apparatus for assemblying link chains according to claim 2, in which said tools each comprise a tool for flaring the individual rings while in the corresponding groove of the cross pins, the flaring comprising deforming each retainer ring to pres against an outer face surface of a corresponding link to hold the individual links axially on the related cross pins.

4. Apparatus for assemblying link chains according to claim 3, in which the retainer rings are metallic.

* * * * *